United States Patent
Oka

[19]

[11] Patent Number: 5,859,721
[45] Date of Patent: Jan. 12, 1999

[54] OPTICAL DEVICE USING A POINT LIGHT SOURCE

[75] Inventor: Junichi Oka, Hikone, Japan

[73] Assignee: Dainippon Screen, Mfg. Co., Ltd., Osaka, Japan

[21] Appl. No.: 630,488

[22] Filed: Apr. 10, 1996

[30] Foreign Application Priority Data

Apr. 27, 1995 [JP] Japan .................................. 7-103543

[51] Int. Cl.⁶ .................................................. G02B 26/08
[52] U.S. Cl. ........................... 359/212; 359/196; 359/197
[58] Field of Search .................................. 359/196, 197, 359/212, 216, 217, 218, 219, 434

[56] References Cited

U.S. PATENT DOCUMENTS

| | | | |
|---|---|---|---|
| 4,235,507 | 11/1980 | Kataoka et al. | 359/363 |
| 4,397,529 | 8/1983 | Taira | 359/434 |
| 4,947,402 | 8/1990 | Kane | 359/858 |
| 5,052,767 | 10/1991 | Sugata et al. | 359/217 |
| 5,170,278 | 12/1992 | Wada et al. | 359/212 |
| 5,337,182 | 8/1994 | Tomita | 359/217 |
| 5,557,449 | 9/1996 | Miyagawa et al. | 359/212 |

FOREIGN PATENT DOCUMENTS 1231015  9/1989  Japan .

*Primary Examiner*—Cassandra C. Spyrou
*Assistant Examiner*—Darren E. Schuberg
*Attorney, Agent, or Firm*—Ostrolenk, Faber, Gerb & Soffen, LLP

[57] ABSTRACT

The light emitted from a point light source is converged by a relay lens to form an intermediate image which is an enlarged image of the light source. The light source and the relay lens are accommodated in the same lens-barrel, and are thereby united as a light source unit. When a problem occurs in the light source, the light source is not independently replaced, but the light source unit is replaced as a unit. That is to say, the intermediate image formed by the light source unit is used as an apparent new light source (referred to as a "pseudo light source"). The emitted luminous flux from this pseudo light source is made parallel by a collimator lens and then is linearly focused into an image on a reflection plane of a deflector by a first cylindrical lens. First cylindrical lens 6 has its focal point in a plane including the rotation axis of the deflector and a slit. The light deflected by the deflector is focused into an image with a prescribed beam diameter on a photosensitive material by a second image forming optical system formed of an fθ lens and a curved second cylindrical lens.

5 Claims, 5 Drawing Sheets

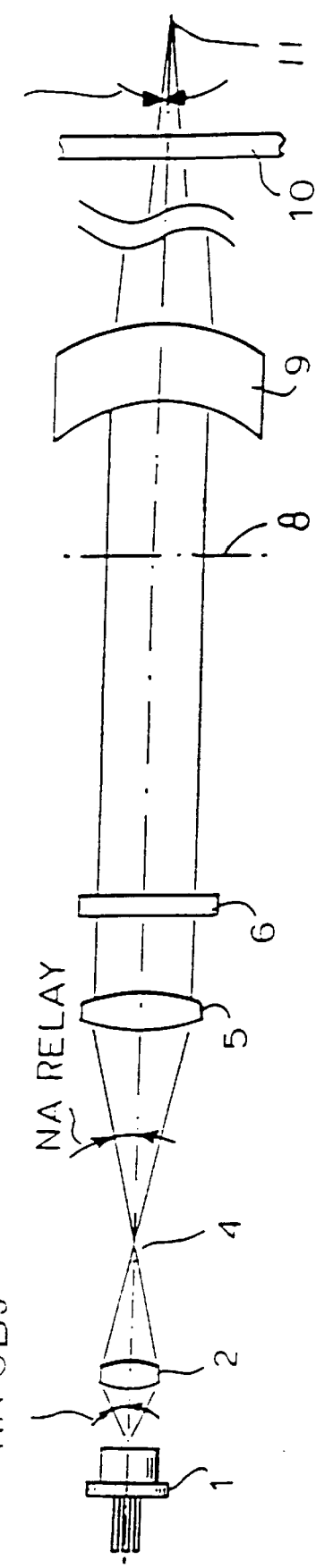
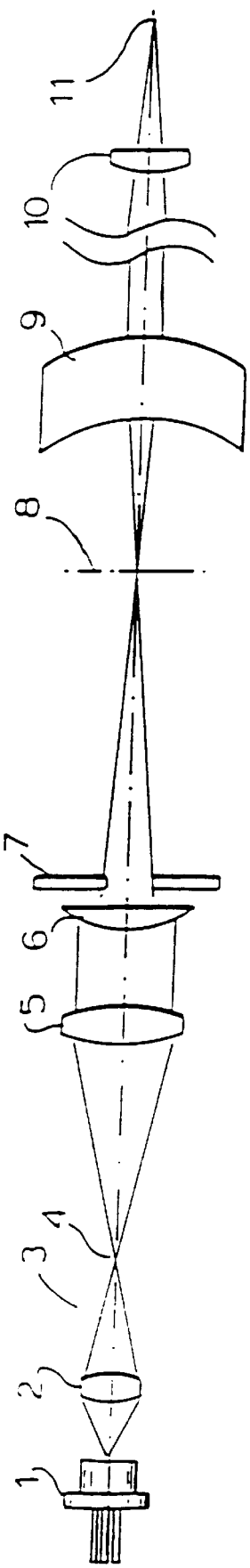
FIG. 3a
FIG. 3b

OPTICAL DEVICE USING A POINT LIGHT SOURCE

BACKGROUND OF THE INVENTION

1. Field of the Invention

The present invention relates to optical devices and more particularly to an optical device which focuses a luminous flux emitted from a point light source into an image at a prescribed position to perform prescribed optical scanning, such as an image recording device.

2. Background of the Invention

In various optical devices using point light sources such as laser diodes, the light source may break down for some reason or other before its product lifetime is expired. If a light source breaks down, the light source must be replaced, but when the focal depth of the final image plane is shallow, a shift between the light source positions before and after replacement will become a problem.

FIG. 1 is a diagram conceptually showing an optical system in a conventional optical device (for example, refer to Japanese Patent Laying-Open No.1-231015.) In FIG. 1, if the NA (hereinafter, an abbreviation for numerical aperture) of the emitted luminous flux on the light source 1 side is designated as $NA_{OBJ.}$, and if the numerical aperture of the incident luminous flux on the final image plane side is designated as $NA_{IMG.}$, and if the positional shift of the light source 1 in the optical axis direction before and after replacement is designated as $\Delta Z_1$, then the moving distance $\Delta Z_2'$ of the final image plane in the optical axis direction is represented by the equation (1) shown below.

$$\Delta Z_2 = (NA_{OBJ.}/NA_{IMG.})^2 \times \Delta Z_1 \tag{1}$$

Accordingly, if the focal depth of the final image plane is $\delta$, then the relation $$(NA_{OBJ.}/NA_{IMG.})^2 \times \Delta Z_1 < \delta$$

must be satisfied to obtain a clear optical image.

Generally, it is required that the numerical aperture $NA_{OBJ.}$ on the light source side be as large as possible. This is due to the fact that a larger numerical aperture $NA_{OBJ.}$ increases a captured amount of the emitted light intensity of the light source 1 to enhance the optical utilization efficiency. If the optical utilization efficiency of the light source is enhanced, a required light intensity can be obtained on the final image forming plane side even with a low power light source. In the case of conventional optical equipment, the numerical aperture $NA_{IMG.}$ on the final image plane side is almost determined by the specification of the equipment. In the case of a scanning optical system, for example, the scanning line pitch determines the image forming beam diameter, which uniquely determines the numerical aperture $NA_{IMG.}$.

As described above, the numerical aperture $NA_{OBJ.}$ on the light source side is preferably as large as possible, but as can be seen from equation (1), the moving distance $\Delta Z_2'$ of the final image plane when the light source is replaced increases in proportion to a square of the numerical aperture $NA_{OBJ.}$. Accordingly, there has generally been a problem that the numerical aperture $NA_{OBJ.}$ on the light source side cannot be indiscriminately increased. If the numerical aperture $NA_{OBJ.}$ is increased to enhance the optical utilization efficiency of the light source, high accuracy in positioning the light source is required when replacing the light source. This requires positioning by the use of component parts worked with higher accuracy or positioning by more difficult adjustments, which will result in a high price, despite replacement parts, or will cause problems of time-consuming adjustment etc.

SUMMARY OF THE INVENTION

It is an object of the present invention to provide an optical device which does not require high positioning accuracy when exchanging a light source without reducing the optical utilization efficiency of the light source.

The present invention is directed to an optical device using a point light source, which includes:

a light source unit including the point light source and at least one optical element for forming an intermediate image of the point light source, the point light source and the optical element being replaceable as a unit; and an optical system receiving the intermediate image for forming a final image plane at a prescribed position;

wherein an absolute value m of a lateral magnification of the intermediate image with respect to the point light source satisfies the relation m>1.

As stated above, in the present invention, a light source unit which is integrally replaceable forms an enlarged intermediate image of the point light source, and the optical system forms a final image plane in a prescribed position using this intermediate image as a pseudo light source. This allows the numerical aperture $NA_{RELAY}$ immediately after the intermediate image to become smaller than the numerical aperture $NA_{OBJ.}$ immediately after the point light source, so that desired accuracy is maintained on the final image plane side even if the positioning accuracy, when the light source unit is replaced, is rougher than when a light source is independently replaced in a conventional optical device, thus providing an optical device of low price or easy adjustment.

In this invention, in a preferred embodiment, a laser diode of small size and low price is used as the point light source.

In another preferred embodiment, the light from the point light source is scanned by a deflector to draw an image, for example.

In still another preferred embodiment, the light source unit includes a group of optical elements to obtain an intermediate image without aberration.

In yet another preferred embodiment, the optical element is a single aspherical lens to attain the same objectives as set forth above.

In addition, another preferred embodiment has the point light source and the optical element accommodated in the same lens-barrel.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3(a) and 3(b) are diagrams schematically showing the lens arrangement and an optical path in the optical beam scanning system of FIG. 2.

DESCRIPTION OF THE PREFERRED EMBODIMENT

Figure 2:
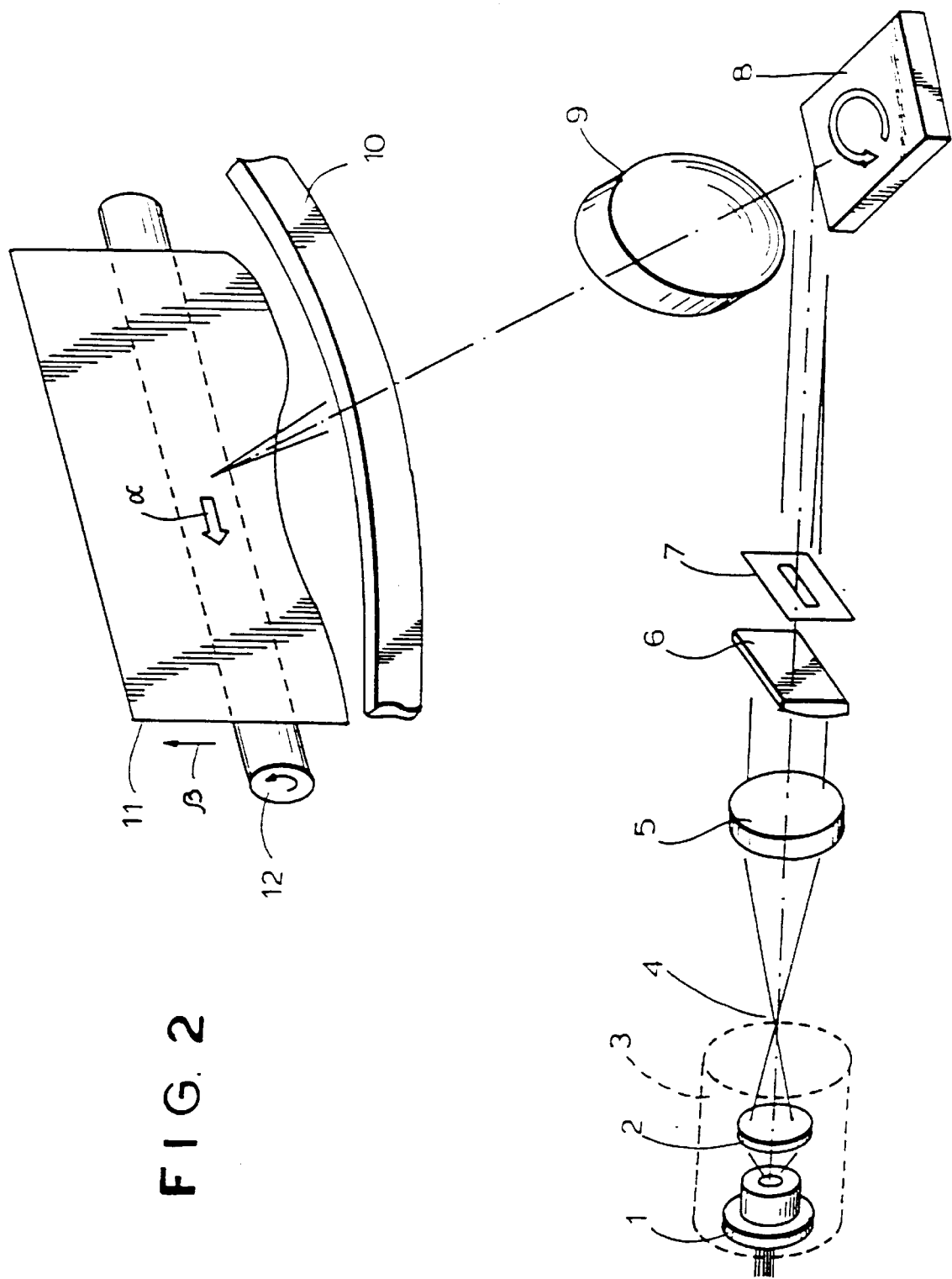
FIG. 2 is a diagram showing the schematic structure of an optical beam scanning system in an optical device according to an embodiment of the present invention.
Figure 5:
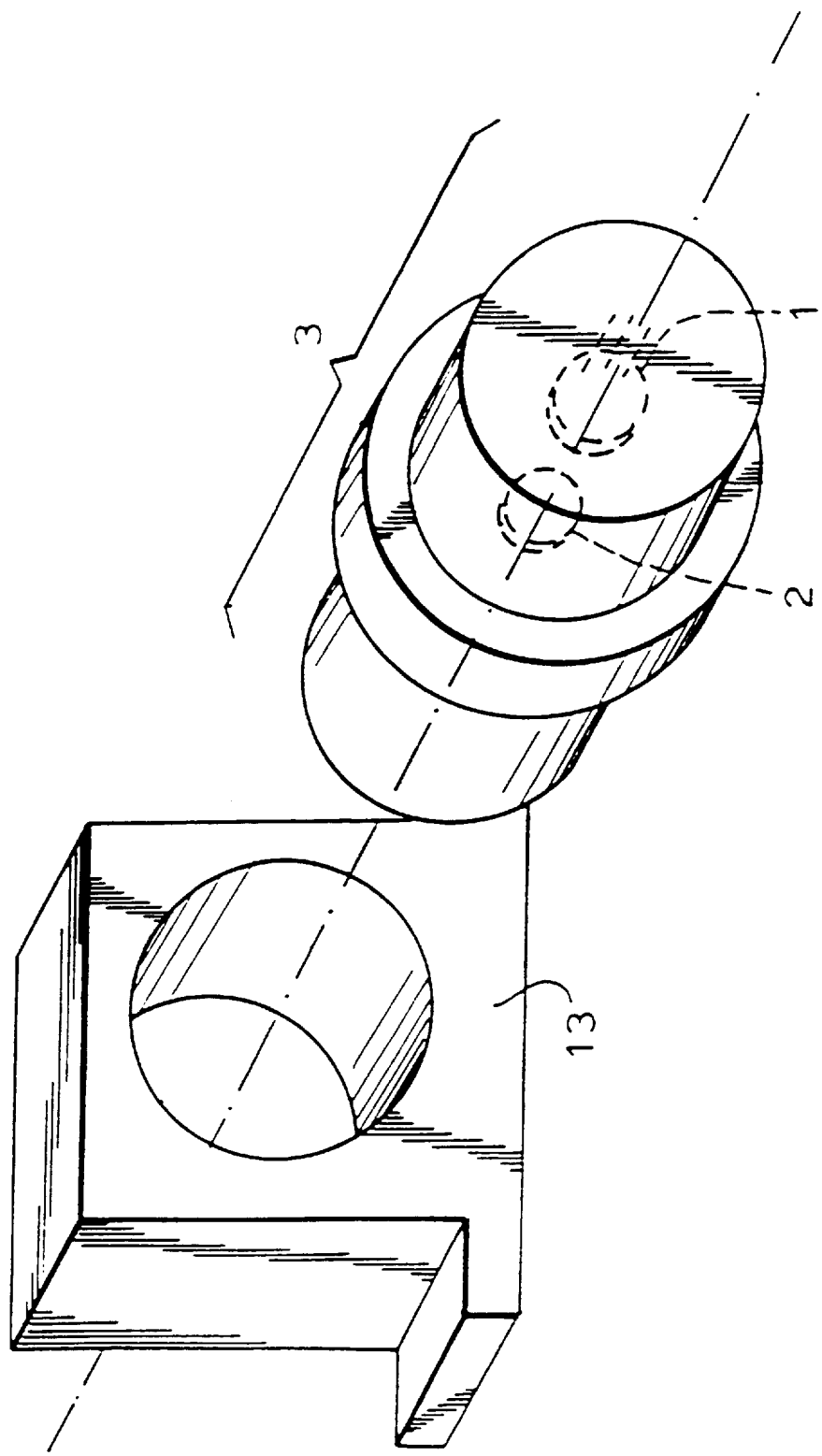
FIG. 5 is a perspective view showing an example of a holding mechanism for the light source unit.

FIG. 2 is a diagram showing the schematic structure of an optical beam scanning system in an optical device according to an embodiment of the present invention. In FIG. 2, the light emitted from a point light source 1, which is a laser diode, a gas laser, or an LED, etc, is converged by a relay lens 2 to form an intermediate image 4 which is an enlarged image of the light source. The light source 1 and the relay lens 2 are accommodated in the same lens-barrel, of as a light source unit 3. When a problem occurs in the light souuce, the light source is not replaced independently, but the light source unit 3 is replaced as a unit. In other words, the point light source 1 and lens 2 are replaced as a unit, and are accommodated in the same lens-barrel. In this embodiment, the intermediate image 4 formed by the light source unit 3 is used as an apparent new light source (hereinafter referred to as a pseudo light source,). The relay lens 2 is a preferable an aspherical lens. This eliminates the aberration of the intermediate image 4. The light source unit 3 is attachably/detachably held by a light source unit holder 13, as shown in FIG. 5.

The emitted luminous flux from the pseudo light source is made parallel by a collimator lens 5 and is then linearly focused into an image on the reflection plane of a deflector 8 by a first cylindrical lens 6. First cylindrical lens 6 has a focal point in the plane which is vertical to the rotation axis of the deflector 8 and the slit 7. The light deflected by the deflector 8, such as a polygon mirror, is focused into an image with a prescribed beam diameter on the photosensitive material 11 by a second image forming optical system comprising an fθ lens 9 and a curved second cylindrical lens 10. When the deflector 8 rotates, the image forming point on the photosensitive material 11 moves in the direction of arrow α, which is the main scanning direction The photosensitive material 11 is transported in the direction of arrow β by the transport roller 12, which is the sub-scanning direction. Accordingly, by switching the light source 1 on the basis of the digital image data, a prescribed image is drawn on the photosensitive material 11.

As described above, the emitted luminous flux from the pseudo light source is linearly focused as an image on the reflection plane of the deflector 8. That is to say, the reflection plane of deflector 8 is at a position optically conjugate with respect to the pseudo light source and the image forming point on the photosensitive material 11. This can prevent the image forming point from deviating from a desired position on the photosensitive material 11, even if the normal to the reflection plane of the deflector 8 is somewhat inclined from the rotation axis due to manufacturing errors, etc. That is to say, the optical device of this embodiment performs optical pyramidal error correction.

FIG.3(a) and 3(b) are diagrams schematically showing the lens arrangement and the optical path in the optical beam scanning system of FIG. 2. Specifically, FIG. 3(a) is a plan view in the plane perpendicular to the rotation axis of the deflector 8, and FIG. 3(b) is a vertical sectional view of FIG. 3(a). In FIG. 3, if the numerical aperture of the luminous flux emitted from the light source 1 to the relay lens 2 is $NA_{OBJ.}$, and the numerical aperture of the luminous flux emitted from the intermediate image 4 after the relay lens 2 is $NA_{RELAY}$, and the numerical aperture of the luminous flux converging onto the photosensitive material 11 (which is the final image plane) is $NA_{IMG.}$, and the absolute value of the image magnification (lateral magnification) of the intermediate image 4 from the light source 1 and the relay lens 2 is m, then $$m = NA_{OBJ.}/NA_{RELAY} \quad (2).$$

Figure 4:
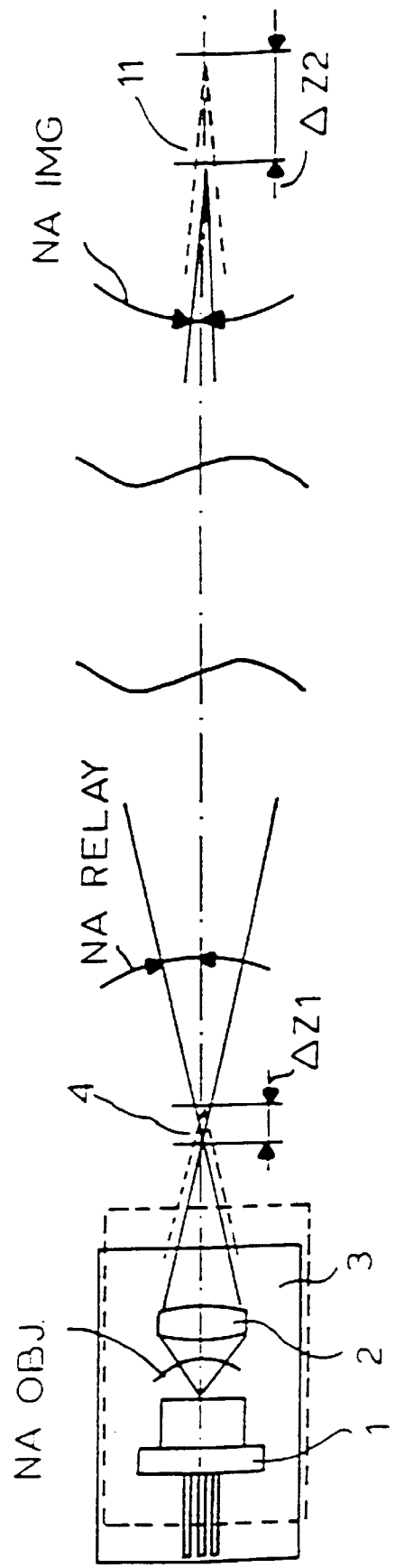
FIG. 4 is a conceptional diagram describing light source replacement accuracy.

FIG. 4 is a conceptional diagram for illustrating the light source replacement accuracy in this embodiment. In FIG. 4, if the light source unit 3 is a replacement unit when the light source breaks down, and if an installation error in the optical axis direction when the light source unit 3 is replaced is $\Delta Z_1$, then the moving distance $\Delta Z_2$ of the final image plane in the optical axis direction is determined $$\Delta Z_2 = (NA_{RELAY}/NA_{IMG.})^2 \times \Delta Z_1 \quad (3).$$

When the equation (2) is substituted into the equation (3), then $$\Delta Z_2 = (NA_{OBJ.}/m \times NA_{IMG.})^2 \times \Delta Z_1 \quad (4).$$

Comparison of the equation (4) with equation (1) shows that the moving distance in the optical axis direction of the final image plane with respect to the installation error on the light source side is $1m^2$ of the conventional optical device Hence, if m>1, when the numerical aperture $NA_{OBJ.}$ on the light source side is the same, the moving distance in the optical axis direction of the final image plane with respect to the installation error on the light source side becomes smaller than in the conventional optical device. This means that high positioning accuracy of the light source unit 3 is not required. As a result, the light source unit 3 can be replaced easily and quickly. On the other hand, if the positioning accuracy of the light source unit 3 is maintained as the same as the positioning accuracy of the light source of the conventional optical system, the numerical aperture $NA_{OBJ.}$ on the light source side can be increased as compared with the conventional optical system, which allows a desired light intensity to be obtained with a light source having a smaller light intensity. This results in a cost reduction and down-sizing of the device.

The effects of this embodiment are described in more detail with respect to specific numerical values. By way of example, it is assumed that the various parameters are set as follows.

$NA_{OBJ.} = 0.15$
$NA_{RELAY} = 0.05$
$NA_{IMG.} = 0.015$
m=3.0
δ=0.33

Further, if the installation repeatability of mechanical parts of the light source unit 3 is 10 μm, then from the equation (3) or (4), moving distance $\Delta Z_2$ of the final image plane in the optical axis direction is 0.11 mm. Since the focal depth δ is about 0.33 mm, a shift of the final image plane in the optical axis direction is not a problem.

Figure 1:
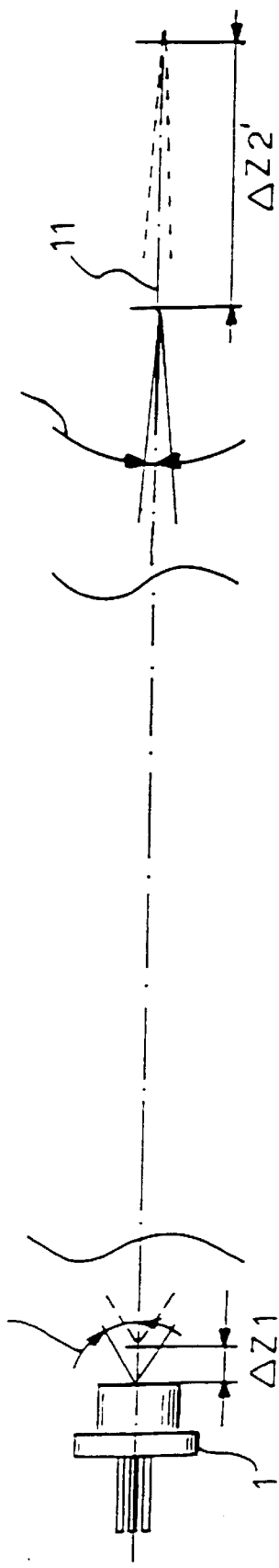
FIG. 1 is a diagram conceptually showing an optical system in a conventional optical device.

In the conventional example shown in FIG. 1, if the numerical aperture $NA_{OBJ.}$ on the light source side and the mechanical repeatability $\Delta Z_1$ of the replacement parts are analogous to the conditions of the above embodiment, the moving distance of the final image plane in the optical axis direction is as large as 1 mm. Then, with this value in this embodiment, it completely gets out of the focal depth to cause a problem in use of the device. For example, when the photosensitive material is arranged at the final image plane before replacement and drawing is performed with the scanning optical system, points and lines drawn after replacement become larger than those before replacement, deteriorating tone. Although the above-described embodiment is by way of an example of the optical system of the present invention arranged between the light source unit 3 and the final image plane, the present invention is not limited to such an example, and optical systems with structures may be used. In short, the present invention can be applied to any optical devices which uses a point light source.

A single relay lens 2 is used in the light source unit 3 to form the intermediate image of the light source 1 in the embodiment described above, but it is anticipated by the present invention that a plurality of relay lenses may be used to form the intermediate image of the light source 1.

While the invention has been described in detail, the foregoing description is in all aspects illustrative and not restrictive. It is understood that numerous other modifications and variations can be devised without departing from the scope of the invention.

What is claimed is:

1. An optical device using a point light source, comprising:
    a light source unit including said point light source and at least one optical element for forming an intermediate image of said point light source, said point light source and said optical element being replaceable as a one piece unit;
    a deflector having a rotating reflection plane and a rotation axis, said deflector deflecting light from said point light source in a first direction; and
    an optical system receiving said intermediate image for forming a final image plane at a prescribed position;
    wherein said intermediate image is formed, between said light source unit and said deflector, as an image converging in said first direction on a plane parallel to said rotation axis of said deflector and as an image converging in a second direction which is vertical to said first direction, and wherein an absolute value m of a lateral magnification of said intermediate image with respect to said point light source satisfies the relation m>1.

2. The optical device according to claim 1, wherein said point light source is a laser diode.

3. The optical device according to claim 1, wherein said light source unit is a group of optical elements.

4. The optical device according to claim 1, wherein said optical element is a single aspherical lens.

5. The optical device according to claim 1, wherein said point light source and said optical element being accommodated in a same lens-barrel.

* * * * *